United States Patent [19]
Nella et al.

[11] Patent Number: 6,079,665
[45] Date of Patent: *Jun. 27, 2000

[54] HYPERSPECTRAL AIR-TO-AIR MISSILE SEEKER

[75] Inventors: John Nella, Playa del Rey; Joseph W. Austin, Torrance; Peter M. Livingston, Palos Verdes Estate, all of Calif.

[73] Assignee: TRW Inc., Redondo Beach, Calif.

[ * ] Notice: Under 35 U.S.C. 154(b), the term of this patent shall be extended for 7 days.

[21] Appl. No.: 08/740,887

[22] Filed: Nov. 4, 1996

[51] Int. Cl.$^7$ .................................................. F41G 7/26
[52] U.S. Cl. ........................................ 244/3.17; 244/3.16
[58] Field of Search ................................. 244/3.15, 3.16, 244/3.17

[56] References Cited

U.S. PATENT DOCUMENTS

| | | | |
|---|---|---|---|
| 4,244,540 | 1/1981 | Vollmerhausen | 244/3.16 |
| 4,465,940 | 8/1984 | Graff et al. | 250/578 |
| 4,497,540 | 2/1985 | Breckinridge et al. | 350/168 |
| 4,765,564 | 8/1988 | Colvocoresses | 244/3.16 |
| 5,129,595 | 7/1992 | Thiede et al. | 244/3.16 |
| 5,135,183 | 8/1992 | Whitney | 244/3.16 |
| 5,216,484 | 6/1993 | Chao et al. | 356/326 |
| 5,323,987 | 6/1994 | Pinson | 244/3.16 |
| 5,329,595 | 7/1994 | Davies | 382/17 |
| 5,333,815 | 8/1994 | Sardanowsky | 244/3.16 |
| 5,341,143 | 8/1994 | Reis et al. | 244/3.17 |
| 5,354,980 | 10/1994 | Rappoport et al. | 250/208.1 |
| 5,379,065 | 1/1995 | Cutts | 348/269 |
| 5,445,453 | 8/1995 | Prelat | 374/43 |
| 5,452,121 | 9/1995 | Hilgeman | 359/260 |
| 5,471,056 | 11/1995 | Prelat | 250/253 |
| 5,524,845 | 6/1996 | Sims et al. | 244/3.17 |
| 5,564,650 | 10/1996 | Tucker et al. | 244/3.17 |

OTHER PUBLICATIONS

Hyperspectrum News Letter, vol. 2, No. 1, May 1995.
Joan B. Lurie, et al., "A System for the Processing and Analysis of Multi–and Hyperspectral Data", *SIG Technology, Winter 1994*, pp. 43–58.

*Primary Examiner*—Charles T. Jordan
*Attorney, Agent, or Firm*—Michael S. Yatsko

[57] ABSTRACT

A hyperspectral detection and seeking system for use in air-to-air, air-to-ground and ground-to-air missiles. The hyperspectral detection and seeking system includes a hyperspectral imaging system and a tracking system. Hyperspectral signatures for targets of interest may be either observed directly prior to launch or preloaded into the detection and seeking system. A tracking system provides for tracking of a target matching the preloaded or hyperspectral signature observed prior to launch. The hyperspectral detection and seeking system thus provides relatively higher precision for detecting and seeking targets with hyperspectral signatures. Since such hyperspectral signatures are formed from literally hundreds of spectra, the system is virtually immune to countermeasure since any countermeasures would effectively have to match its own hyperspectral signature over a relatively wide spectral range.

6 Claims, 3 Drawing Sheets

HYPERSPECTRAL AIR-TO-AIR MISSILE SEEKER

BACKGROUND OF THE INVENTION

1. Field of the Invention

The present invention relates to an hyperspectral detection and seeking system and more particularly to a hyperspectral detecting and seeking system for air-to-air missiles for tracking and seeking both airborne targets, such as aircraft and missiles as well as ground base targets, with predetermined hyperspectral signatures with relatively high accuracy relative to known systems which minimizes the possibility of false targeting while providing relative immunity against countermeasures.

2. Description of the Prior Art

Various techniques are known for detecting and seeking various airborne targets, such as aircraft and missiles. Examples of such systems are disclosed in U.S. Pat. Nos.: 4,465,940; 5,129,595; 5,323,987; 5,333,815; and 5,445,453. Such systems normally track the infrared emissions of the target either in a single or a few spectral bands. Unfortunately, with such systems, relatively simple flares and in-band sources can be used as effective countermeasures to prevent such systems from acquiring and/or tracking the target. When such systems are used in weapon systems, successful implementation of countermeasures significantly reduces the weapon's effectiveness.

Moreover, such systems have relatively limited utility for discriminating against various targets. As such, a risk exists that other objects having the same single or multiple band spectral signature will be targeted by the system. Such a situation could result in a friendly target being inadvertently targeted while the intended targets go undetected.

SUMMARY OF THE INVENTION

It is an object of the present invention to solve various problems in the prior art.

It is yet another object of the present invention to provide a target detection and seeking system for detecting both airborne and ground base targets with relatively higher precision than known detection and seeking systems.

It is yet another object of the present invention to provide a detection and seeking systems which provides increased immunity to countermeasures thereby improving the effectiveness of the system.

It is yet another object of the present invention to provide a hyperspectral seeking and detection system for use on air-to-air missiles for tracking airborne targets as well as ground base targets with predetermined hyperspectral signatures.

Briefly, the present invention relates to a hyperspectral detection and seeking system for use in air-to-air missiles which includes a hyperspectral imaging system and a tracking system. The hyperspectral detection and seeking system provides relatively higher precision of detecting and seeking targets using the target's hyperspectral signatures. Since such hyperspectral signatures are formed from literally hundreds of spectra, the system is virtually immune to countermeasures since any countermeasure would effectively have to match the target's hyperspectral signature over a relatively wide spectral range.

DESCRIPTION OF THE DRAWINGS

These and other objects of the present invention will be readily understood with reference to the following specification and attached drawing wherein.

A DETAILED DESCRIPTION OF THE INVENTION

The present invention relates to a hyperspectral detection and seeking system for use in air-to-air, air-to-ground missiles, or ground-to-air missiles. The hyperspectral detection and seeking system provides relatively more precise detection and seeking of airborne targets, such as missiles and aircraft as well as ground based targets, such as camouflaged items, tanks and various ground vehicles. In addition, due to the precision of such a system, the detection and seeking system in accordance with the present invention is able to discriminate among various types of targets.

Figure 1A:
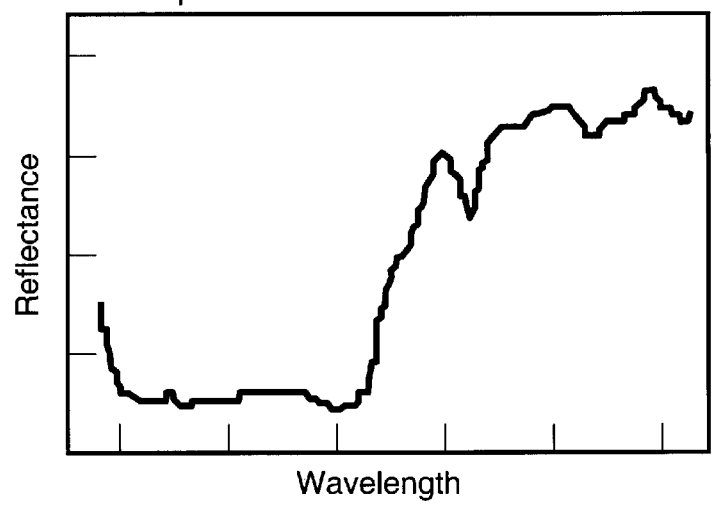
FIG. 1A is a graphical illustration of a spectral characteristic of a background scene of interest.
Figure 1B:
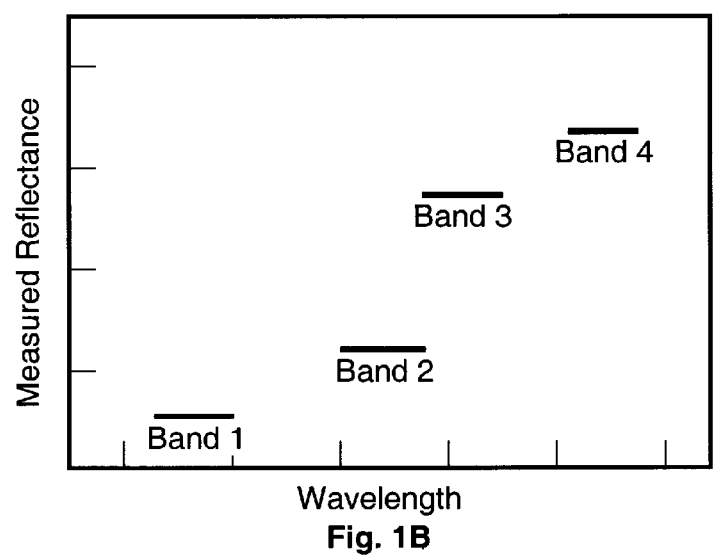
FIG. 1B is a graphical illustration of a multi-spectral signature of the scene illustrated in FIG. 1A.
Figure 1C:
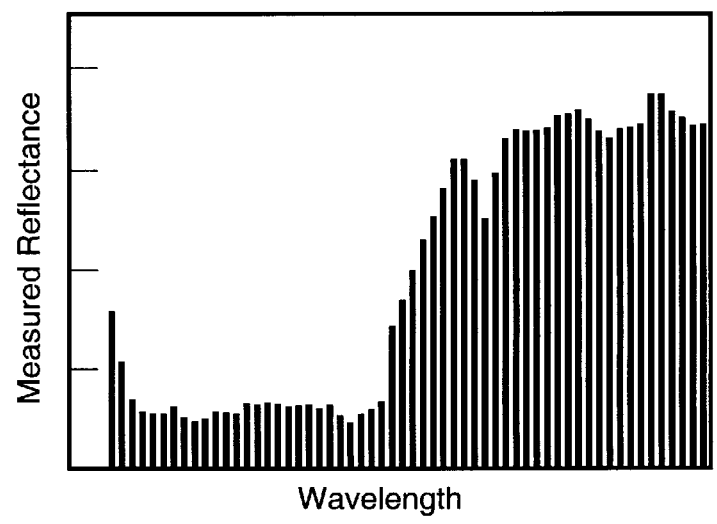
FIG. 1C is a graphical illustration of a hyperspectral signature of the scene illustrated in FIG. 1A.

Hyperspectral imaging for use in missile detection and seeking systems is heretofore unknown. As discussed above, known systems utilize single and multi-spectral based detection systems. FIG. 1A–1C illustrates the difference between multi-spectral sensing and hyperspectral sensing. In particular, FIG. 1A illustrates the spectral characteristics of a background scene of interest. FIG. 1C illustrates the hyperspectral signature of the scene while FIG. 1B illustrates the multi-spectral signature. As illustrated in FIGS. 1B and 1C, the hyperspectral imagery contains a significantly greater amount of detail than the multi-spectral imaging signature. As such, by utilizing hyperspectral imaging, the precision of such a system is relatively higher than systems based upon single or multiple spectral bands.

As is known in the art, there are three main sources of radiation in which the hyperspectral measurements can be made:

1. Reflected solar/celestial [E ( )] from the target or object.
2. Emitted thermal radiation. [Wbb ( )] from the target or object or;
3. Line emission $L(\lambda)$ from the target exhaust.

These radiation sources maybe sensed by hyperspectral sensors. Hyperspectral sensors provide an optical signal provided by the following equation:

$$\text{Signal} \approx T_t(\lambda)\{\rho_t(\lambda)T_a(\lambda)[E_{sun}(\lambda)+E_{lunar}(\lambda)]+\in_t(\lambda)W_{bb}(\lambda,T)+L_{active}(\lambda)\}$$

where:

$\rho_t(\lambda)$=spectral reflectance of the target $\in_t(\lambda)$=spectral emissivity of the target $T_t(\lambda)$=atmospheric transmission from the target to the sensor $T_a(\lambda)$=atmospheric transmission exoatmospheric to the target The distinguishing target and background information is contained in the spectral reflectivity $\{\rho_t(\lambda)\}$, the spectral emissivity $\{\in_t(\lambda)\}$, the temperature T of the target and/or the unique emission $\{L_{active}(\lambda)\}$ if the target is an active emitter.

Figure 2:
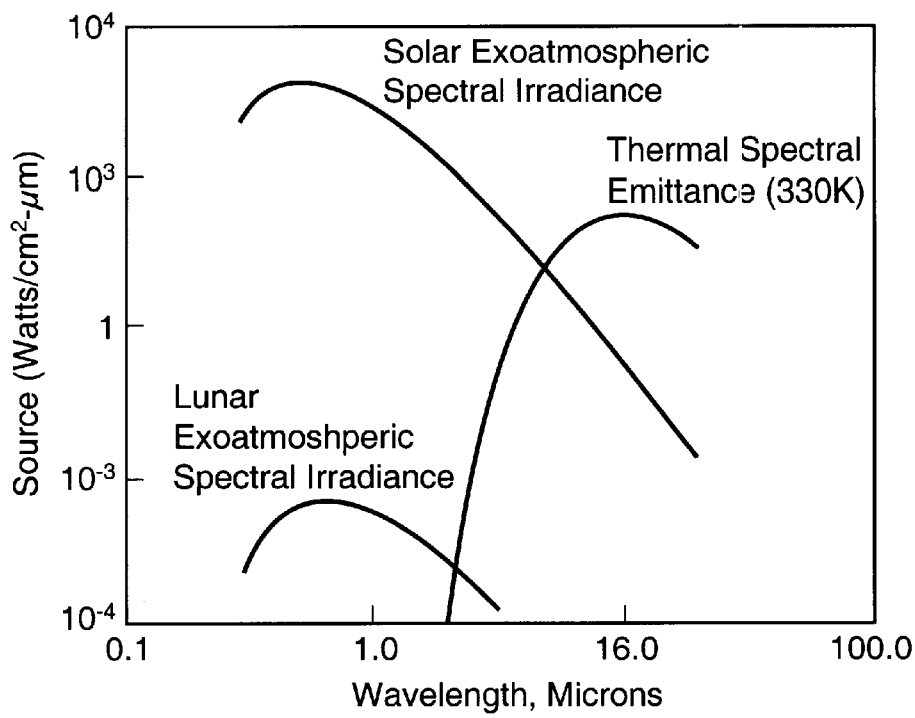
FIG. 2 is a graphical illustration of the potential source illumination and emission for hyperspectral applications.

FIG. 2 shows the relative strength of the solar/lunar exoatmospheric spectral irradiance and the thermal emittance of 330K blackbody. As shown, the solar intensity far exceeds all other sources of radiation in the visible to short wave infrared portion of the spectrum (i.e. 0.4 microns to approximately 3 microns.) During the day such a portion of the spectrum can be readily seen in FIG. 3, there is nearly a 6 order-of-magnitude reduction in illumination with a bright full moon. However, the mid to far infrared portion of the spectrum is appropriate for detecting targets at night. The mid to far infrared portion of the spectrum is also required to detect some species of active emitters from exhaust plumes. In the mid infrared (i.e. 3–5 microns), there is a partial mixing of sources due to solar radiation as well as thermal radiation from the target being the same order of magnitude during daylight conditions.

The hyperspectral detecting and seeking system in accordance with present invention is based upon hyperspectral imaging for detecting and providing target seeking information to a tracking system. Prior to launching the missile, the spectral signature for the intended target is provided to the hyperspectral imaging system either directly by observing a target of interest or remotely by supplying the spectral signature of the target as obtained from a separate hyperspectral imagery system prior to launch of the missile. After launch, the system in accordance with the invention seeks the target which matches the target spectral signature. The system maintains tracking of the target spectral signature that matches the target signature as specified prior to the missile launch.

Figure 3:
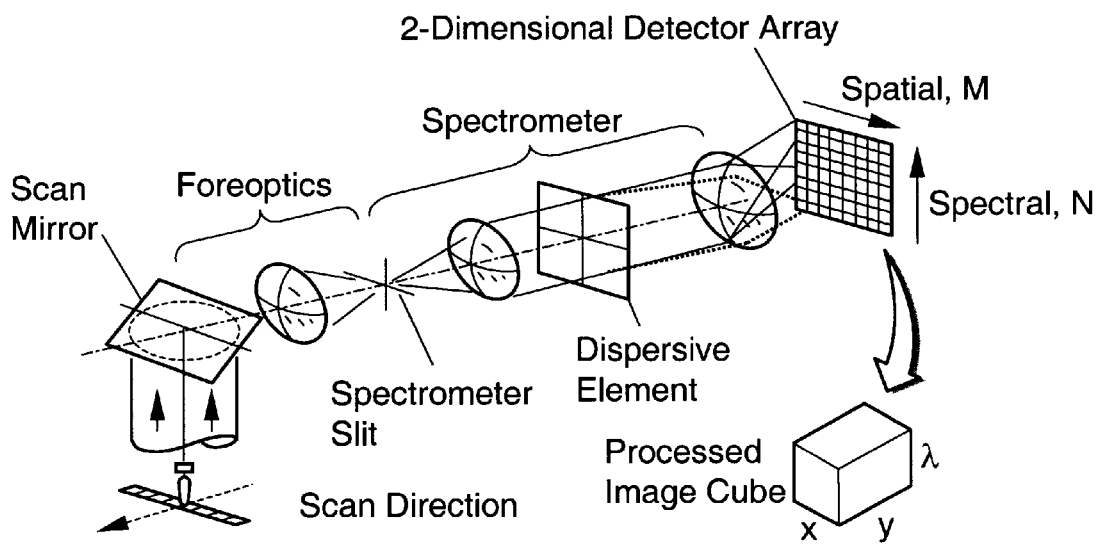
FIG. 3 is simplified pictorial illustration of a known dispersive spectrometer.

Such hyperspectral imaging systems include a spectrometer. Various types of spectrometers are known including dispersive spectrometers, Fourier transform spectrometers, spatially modulated imaging Fourier transform spectrometers as well as wedge filter spectrometers. Although various types of spectrometers may be utilized with the present invention, the preferred spectrometer is a dispersive spectrometer as illustrated in FIG. 3. Such dispersive spectrometers are preferred because of: simultaneous spectral coverage of the imaged pixels providing good spatial registration and yielding an inherent immunity to tracking errors and platform instabilities; imagery is directly available and does not require any computational and intensive inversion algorithms; a single frame where a set of colors can be sent directly to a remote site at a reduced bandwidth without any pre-processing transforms; imagery can be viewed in real time and processed in real time; the design uses a straight forward low risk implementation; and imagery can be made compatible with existing user video/computer systems.

Referring to FIG. 3, a dispersive spectrometer is shown, which illustrates two dimensional detector arrays used for a dispersive spectrometer focal plane. The spectrometer slit is imaged onto one row of the two dimensional detector array of length M. The dispersive property of the grating/prism spreads the light coming from each point within the slit in a direction generally orthogonal to the slit along the other dimensional of length N of the array. Each scene imaged pixel (total of M pixels, with corresponding ground sample distance-GSD) consists of N spectral measurements corresponding to the N detectors along the spectral direction of the two dimensional sense array. For each spatial pixel the resulting information, after calibration and atmospheric corrections, is treated as an N-dimensional vector providing a spectral signature for each and every pixel in the scene as follows:

$$\text{Signal for pixel } j = S^j =, S\lambda_1^j, S\lambda_2^j, S\lambda_3^j, S\lambda_4^j, \ldots, S\lambda_N^j$$

As such, processing steps can be based upon linear algebra and statistics. Additional processing using only subsets of the spectral data are also possible.

Various spectrometers are suitable for use in the missile detection and seeking system in accordance with the present invention. Such a spectrometer is described in detail in U.S. Pat. No.:5,329,595 as well as in "A System for the Processing and Analysis of Multi-and Hyperspectral Data" by Joan B. Lurie, Bruce Evans, Matthew Yeates, Terri Morrison, Xi Deng, John Gibson and Brian Ringer, SIG Technology Review, Winter 1994, pp. 43–58.

Figure 4:
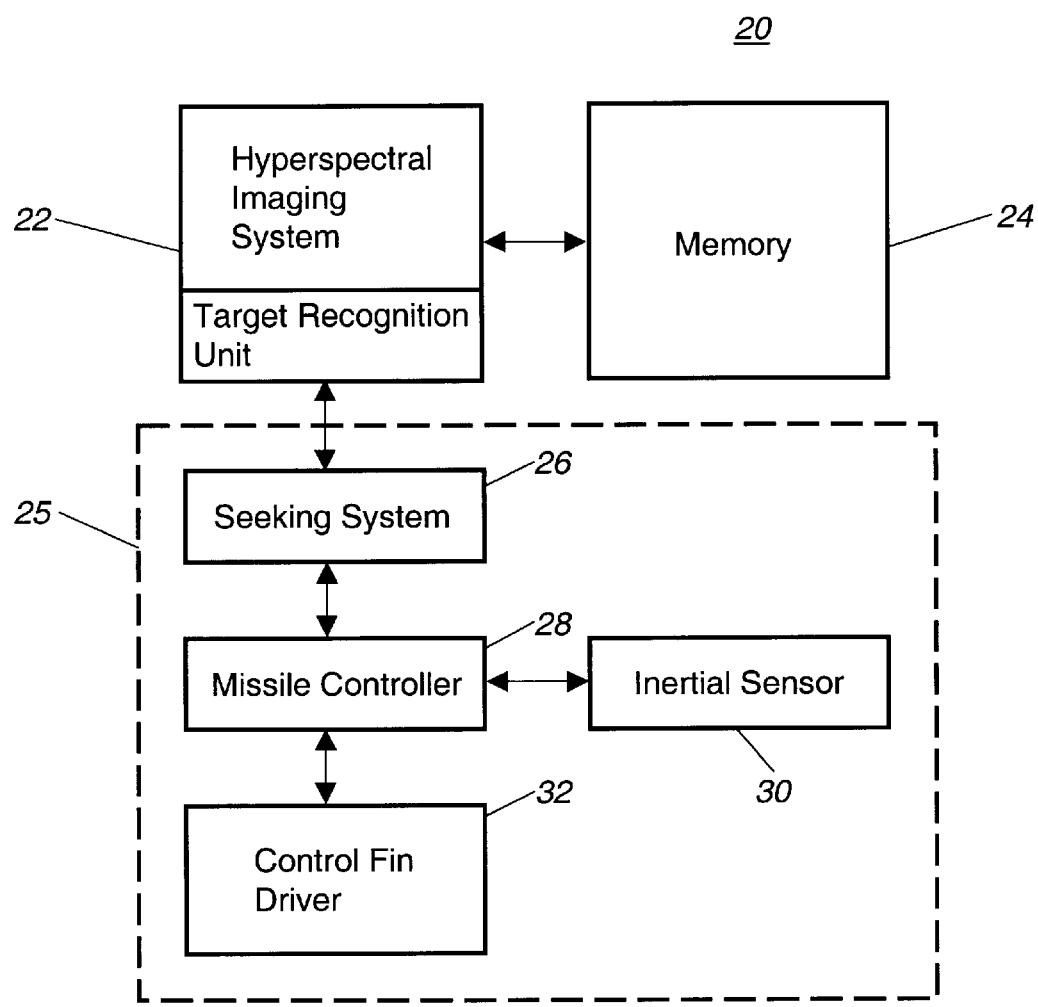
FIG. 4 is a block diagram of the hyperspectral detection and seeking system for use in air to air missile in accordance with the present invention.

A block diagram of the system in accordance with present invention is illustrated in FIG. 4. The system 20 includes a hyperspectral imaging system 22 for generating hyperspectral images of objects in its field of view which may include a dispersive type spectrometer as discussed above. The hyperspectral imaging system 20 also includes a target recognition unit for comparing hyperspectral signature and determining if such hyperspectral signatures match hyperspectral signatures stored before launch of the missile system. A detail description of a hyperspectral imaging system is disclosed in U.S. Pat. No. 5,329,595, assigned to the same assignee as the assignee of the present invention and hereby incorporated by reference. A tracking system, shown within the box 25, tracks targets having spectral signatures which match the spectral signature of interest. The tracking system 25 includes a seeker system 26, for example, as described in detail in U.S. Pat. No. 5,323,987, herein incorporated by reference. The seeker system can be used to determine the flight path or location of the target having a matching hyperspectral signature. The seeker system 26, in turn, is applied to a missile controller 28 which controls the flight path of the missile by manipulating control fins and/or other control devices on the airframe controlled by a fin driver control system 32 to direct the missile to the target, identified by the hyperspectral signature. An inertial sensor system 30 provides information to the missile controller 28 regarding its spatial position. The seeker system 26, missile controller 28, inertial sensor system 30 and fin driver control system 32 are part of the tracking system 25 and are described in detail in U.S. Pat. No. 5,322,987, hereby incorporated by reference.

As mentioned above, known systems use either a single or relatively few spectral bands. In comparison with single or multiple spectral systems in which relatively only one or a few broad spectral bands are used, hyperspectral imaging contains relatively hundreds of spectra for each scene pixel which can be used to provide more precise target acquisitions as well as providing the ability to characterize both a target and background signature.

Obviously many modifications and variations of the present invention are possible in light of the above teachings. Thus, it is to be understood that, within the scope of the appended claims, the invention may be practiced otherwise than as specifically described above.

What is claimed and desired to be secured by a letters patent of the united states is:

1. A target detections, seeking and guidance system for an air-to-air, air-to-ground and/or ground-to-air missile comprising
   a hyperspectral imaging system for detecting a target having a predetermined hyperspectral signature;
   means for enabling the missile to track the target matching the predetermined hyperspectral signature; and
   means including a missile controller for guiding the flight path of the missile to intercept the flight path of the target matching said predetermined hyperspectral signature.

2. The target detection and seeking system as recited in claim 1, wherein said hyperspectral imaging system includes a dispersive type spectrometer.

3. The target detection and seeking system in claim 1, wherein said enabling means includes a seeker system for determining the location or flight path of the target matching said predetermined hyperspectral signature.

4. A target detection, seeking and guidance system for a missile comprising:

a hyperspectral imaging system carried by said missile for detecting targets having predetermined hyperspectral signatures;

a tracking system for tracking the target matching the predetermined hyperspectral signature; and means including a missile controller for guiding the flight path of the missile to intercept the target matching said predetermined hyperspectral signature.

5. A method for detecting, seeking and intercepting a target, comprising the steps of:

(a) determining the hyperspectral signature of the target of interest;

(b) seeking targets matching the hyperspectral signature of interest;

(c) tracking the target matching the hyperspectral signature of interest; and (d) guiding a missile to intercept the target matching the hyperspectral signature of interest.

6. A target detections seeking and guidance system for missile comprising:

means for detecting targets having a predetermined hyperspectral signature;

means for tracking targets having a hyperspectral signature matching said predetermined hyperspectral signature; and means for guiding said missile to intercept the target matching said predetermined spectral signature.

* * * * *